March 18, 1947.　　　E. G. SIMPSON　　　2,417,523
SEAT ADJUSTER
Filed July 14, 1943　　　4 Sheets-Sheet 4
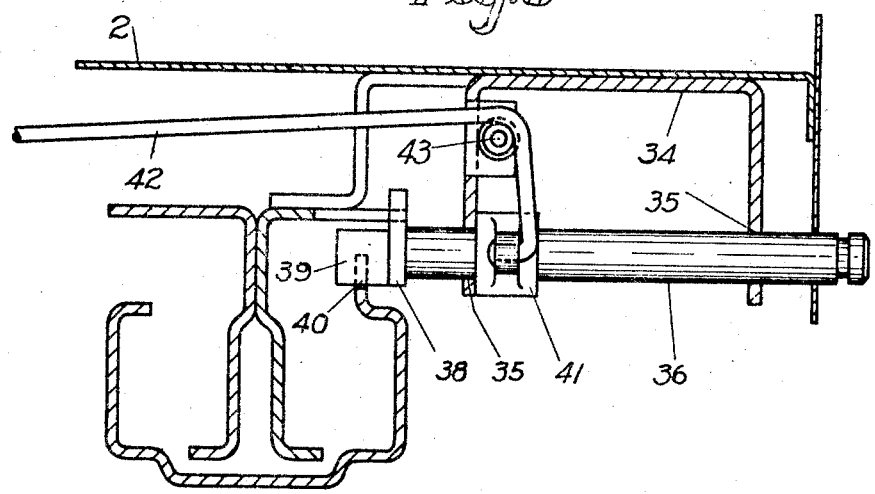
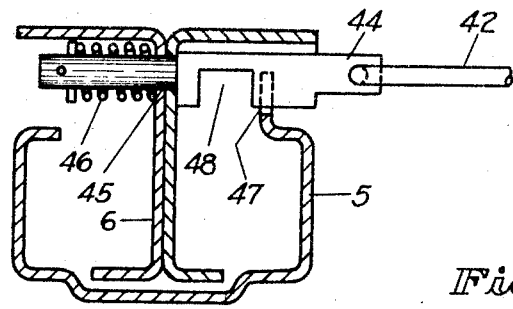
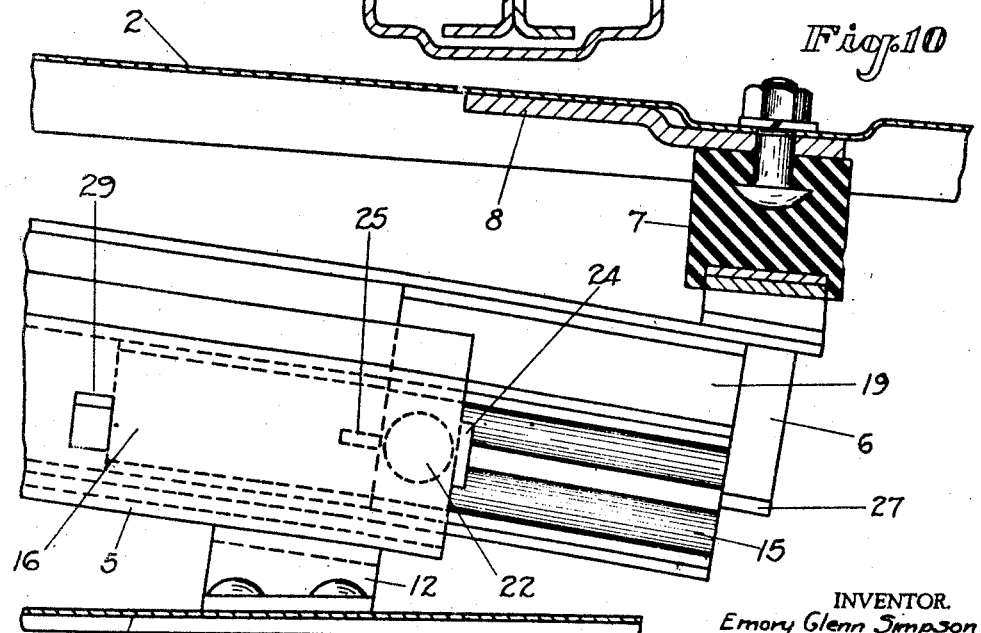
INVENTOR.
Emory Glenn Simpson
BY Barnes, Kisselle, Laughlin & Raisch
Attorneys Patented Mar. 18, 1947

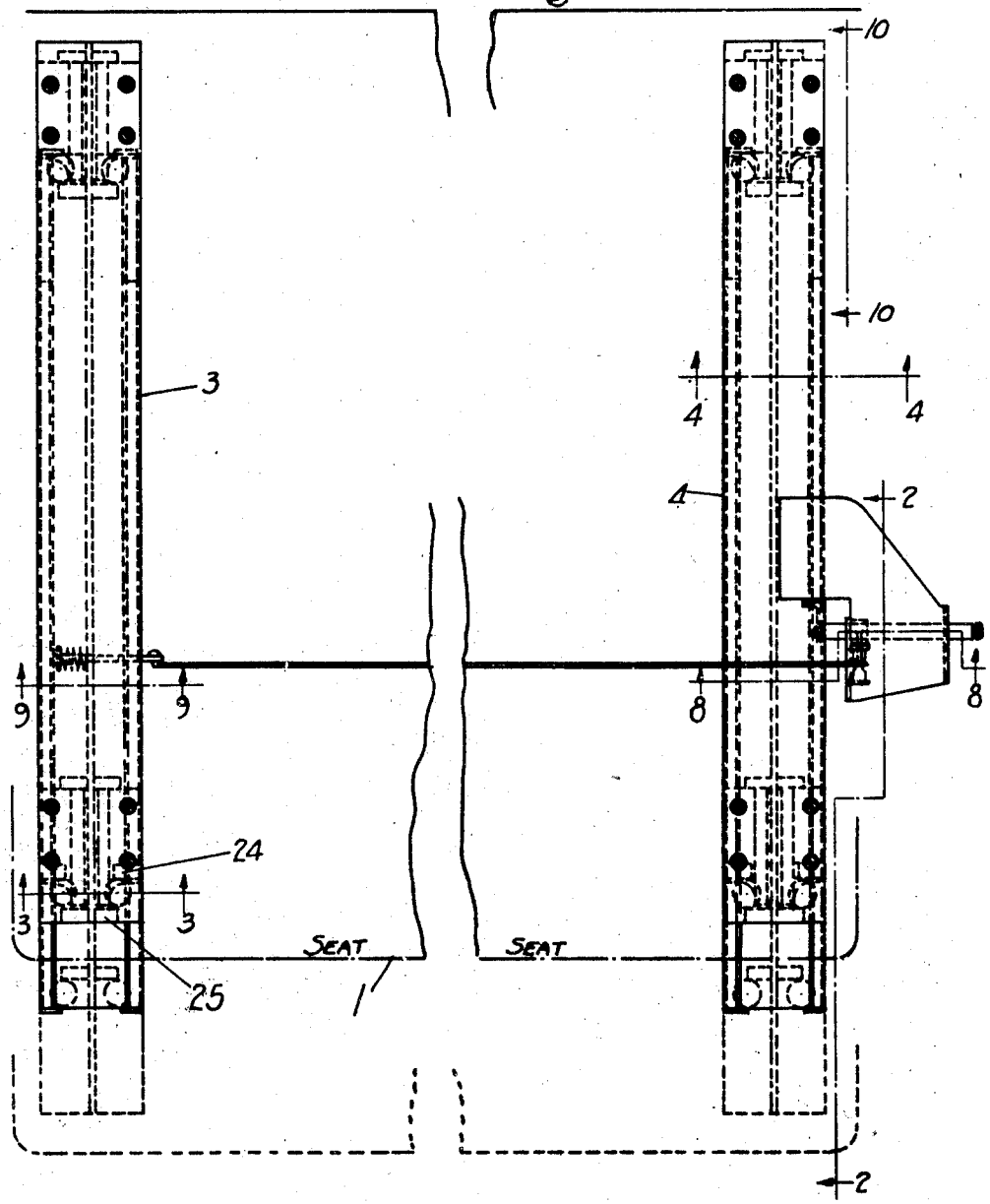

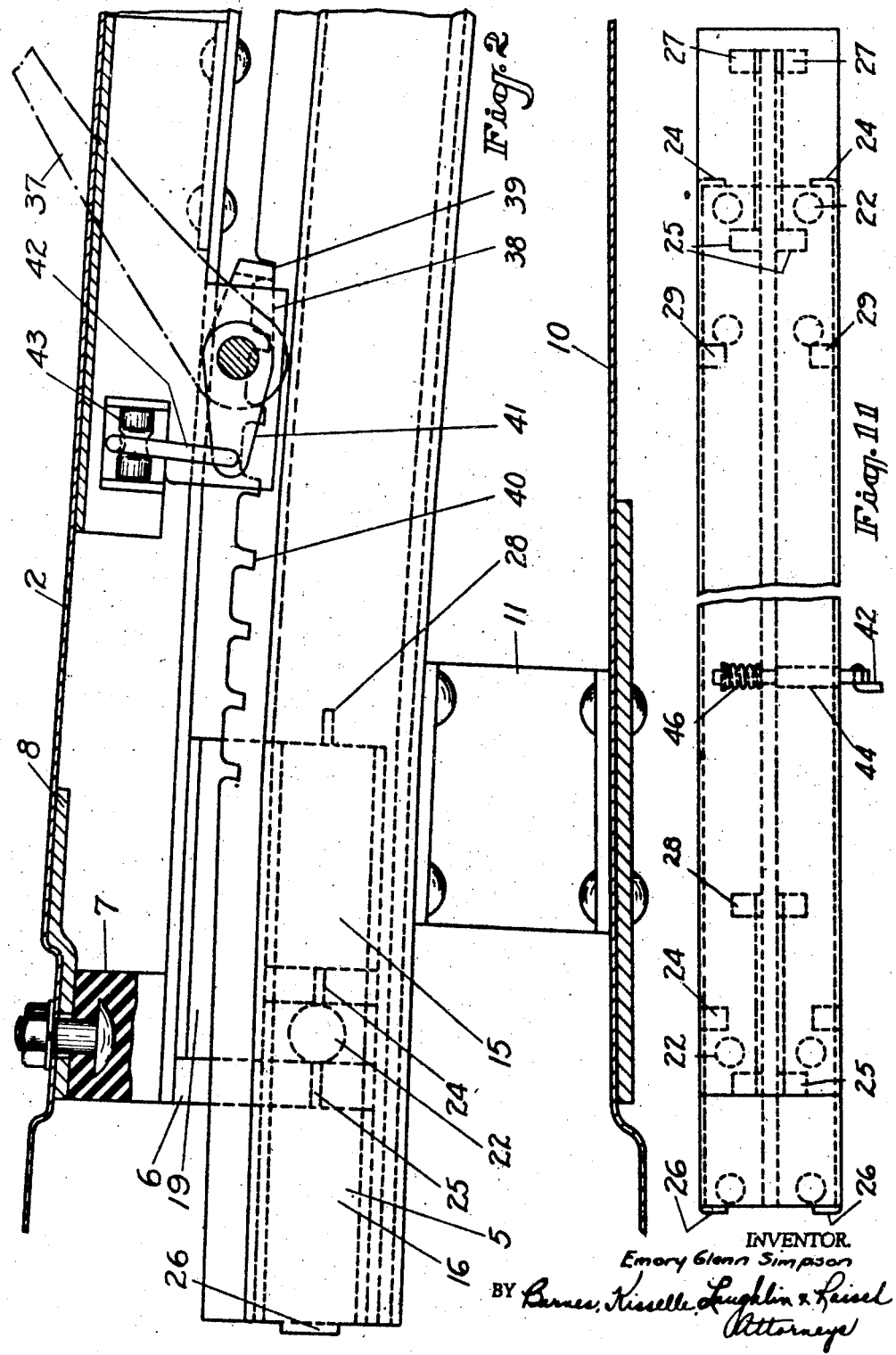

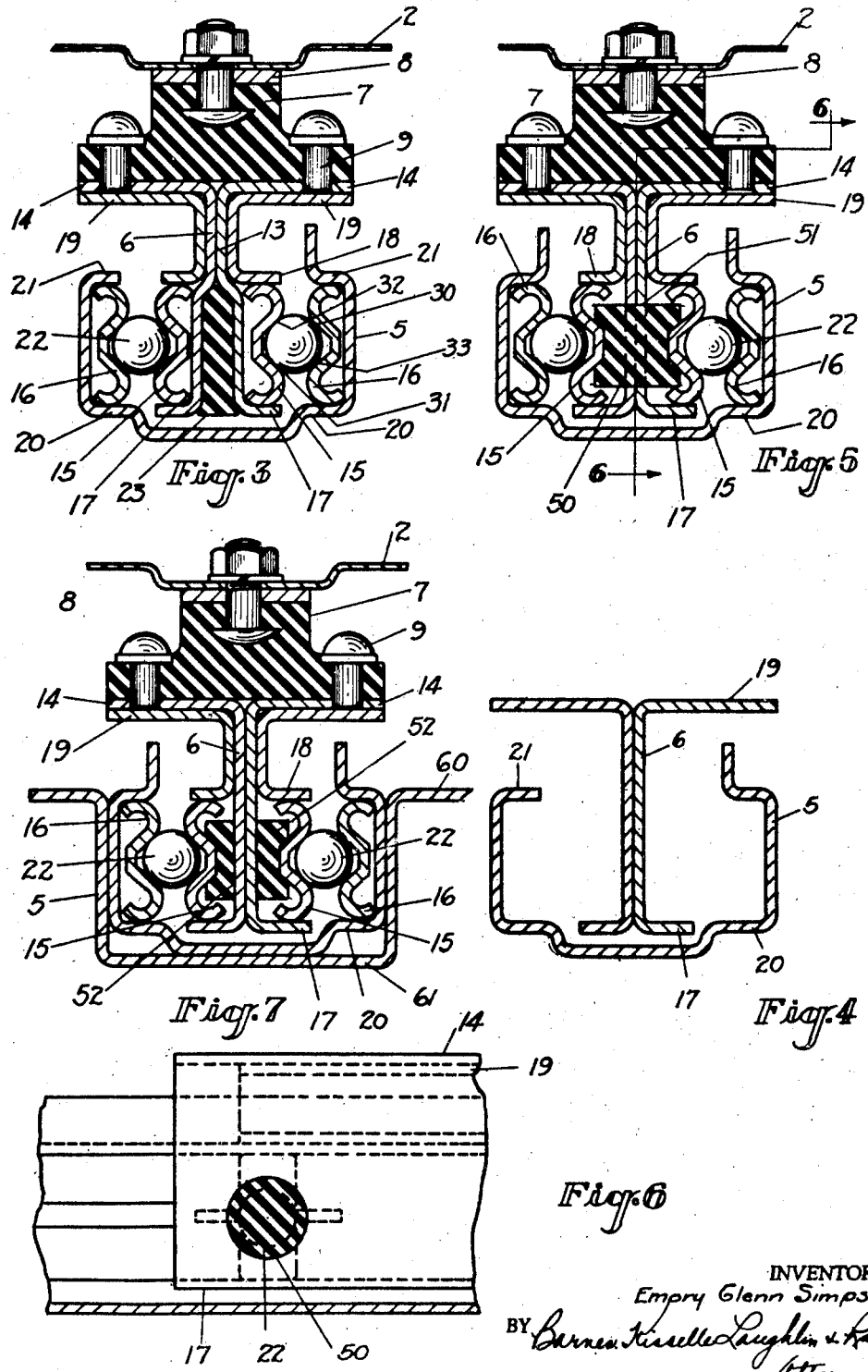

2,417,523

UNITED STATES PATENT OFFICE 2,417,523

SEAT ADJUSTER

Emory Glenn Simpson, Detroit, Mich., assignor, by mesne assignments, to General Motors Corporation, Detroit, Mich., a corporation of Delaware Application July 14, 1943, Serial No. 494,603

7 Claims. (Cl. 155—14)

1

This invention relates to an adjustable seat and more particularly to an adjustable seat for an automotive vehicle.

It is old in the art to mount an adjustable automobile seat upon rollers which roll on tracks. To prevent the rollers from cocking or binding in the tracks it is a common practice to provide each of the parallel tracks with a rack. These racks are meshed with gears fixed on an equalizing shaft which is journalled on the seat. The equalizing shaft and gears causes the seat to move uniformly on each side back and forth in its tracks without cocking or binding. It is one of the objects of this construction to produce a seat adjuster which will operate easily and with a minimum of friction under all conditions of loading and which will move uniformly on each side of its tracks without binding or cocking and thereby obviate the need for any equalizing shaft.

In the commonly used seat adjuster having an equalizing shaft the shaft travels back and forth with the seat as it is adjusted. A clear path must be provided for the equalizing shaft. To avoid interference with various portions of the floor pan of the vehicle body it has heretofore been necessary to design the seat adjuster or its mounting so that the equalizing shaft will clear the floor pan. This has prevented locating the seat as low as might be desirable in some cases and thus has cut down the available head room in the vehicle body. It is an object of this invention to produce a seat adjuster which facilitates mounting of the seat close to the floor pan and thereby creates a maximum of head room.

The invention also contemplates a seat adjuster which is simple in form, rattle-proof, easy to operate while adjusting the seat and in which the parts are reversible so that each may be used at either end of the seat.

In the drawings:

Fig. 1 is a top plan view showing a seat mounted on the seat adjuster which is the subject of this invention.

Fig. 2 is a fragmentary view partly in section and partly in elevation along the line 2—2 of Fig. 1.

Fig. 3 is a section along the line 3—3 of Fig. 1.

Fig. 4 is a section along the line 4—4 of Fig. 1.

Figs. 5 and 7 are sections corresponding to the sectional view Fig. 3 but showing modified forms of the seat adjuster tracks, Fig. 5 being the preferred form.

Fig. 6 is a section along the line 6—6 of Fig. 5.

Fig. 8 is a section along the line 8—8 of Fig. 1.

Fig. 9 is a section along the line 9—9 of Fig. 1.

2

Fig. 10 is a view along the line 10—10 of Fig. 1.

Fig. 11 is a top plan view looking down on the upper and lower track members showing the clearance between the tabs.

Referring more particularly to the drawings, the seat is designated 1 and the seat bottom or pan 2. It is evident that the seat is supported upon its left hand side upon a pair of cooperating tracks 3 and also upon its right hand side upon another pair of cooperating tracks 4 parallel to tracks 3. Since track assemblies 3 and 4 are identical, the description of one will apply equally well to the other. Each track assembly comprises a lower stationary track 5 and an upper movable track 6.

The seat is supported at the front and rear end of the upper track 6 by rubber blocks 7. The rubber blocks 7 are vulcanized to reinforcing members 8 which are bolted to the seat pan 2. The upper track 6 is provided with flanges 14 along its upper edge which are secured by rivets 9 to the front and rear rubber blocks 7. Thus the four rubber blocks upon which the seat is mounted serve as a floating mount for the same.

The lower track member 5 takes the form of a U-channel member which is supported on the floor or floor pan 10 of the vehicle body at its front and rear ends by means of brackets 11 and 12 respectively.

Track member 6 comprises two angular metal stampings welded together as at 13. Track 6 is arranged to have a ball bearing fit in track 5. To this end track 6 adjacent its front end is provided with a pair of inner races 15 and stationary track 5 is provided with a pair of outer races 16. Races 15 and 16 are short metal stampings identical in form and size. Each race is symmetrical and may be interchangeably used at the front or rear of the seat or on either side. Races 15 are held between outwardly turned flanges 17 along the lower edge of track 6 and flanges 18 turned outwardly from brackets 19 which are welded to track 6. Races 16 are held between the bottom wall 20 of stationary track 5 and flanges 21 turned inwardly from the side walls of track 5. A ball bearing 22 is mounted between each pair of cooperating races 15 and 16. Referring to Figs. 1, 2 and 10, it will be seen that each pair of tracks 3 and 4 is provided at its front and rear ends with the ball bearing race assembly just described.

A block of rubber 23 is held between the halves of the upper track 6. This rubber block 23 is under compression and serves to spread the parts of the track to preload the ball bearings 22 in their races. This block of rubber also tends to quiet the operation of the adjuster.

The seat as shown in Figs. 2 and 10 is at its extreme rearward position. In this position the ball bearings 22 are engaged between tabs 24 turned or struck inwardly from the side walls of the lower track 5 and tabs 25 turned or struck outwardly from the walls of the upper track 6. The seat may be moved forwardly from the position shown in Figs. 1, 2 and 10 to a point where the front ball bearings 22 are engaged between tabs 26 turned inwardly from the front end of stationary tracks 5 and tabs 28 turned outwardly from the track 6, and the rear ball bearings 22 are engaged between tabs 27 turned outwardly from the rear end of movable tracks 6 and tabs 29 turned inwardly from the track 5. The tabs are so dimensioned that in the adjustment of the seat front tabs 25 will clear or pass tabs 26, rear tabs 25 will pass tabs 29, tabs 28 will pass front tabs 24, and tabs 27 will pass rear tabs 24. From the above it is evident that in the adjustment of the seat upper track 6 will travel with respect to lower track 5 twice the distance that each ball bearing 22 will travel.

Referring to the cross section Fig. 3, it will be seen that the load on ball bearings 22 may be imposed diagonally in both directions from the upper contact line 30 of race 16 to the lower contact line 31 of race 15 and from the upper contact line 32 of inner race 15 to the lower contact line 33 of outer race 16. The inner and outer races are positioned with respect to each other so that they are forced apart slightly when the ball bearings are inserted between them, thereby compressing rubber block 23 and forming in effect a preloaded bearing. Not only is the rubber block 23 under compression but the side walls of the lower track 5 are under tension caused by the preloading of the ball bearings 22 in the races. Since the front and rear ball bearings are preloaded, it is possible to position them as far apart fore and aft of the seat as the length of the seat will allow so as to resist to the greatest extent of any tendency of one end of the seat to move ahead of or out of synchronism with the other. The preloading of ball bearings 22 also automatically takes up any wear that occurs between the ball bearings and the races to always keep the track assembly free of rattles.

Referring to the lock mechanism a stamped bracket 34 is secured to the seat pan and provides spaced bearings 35 for the usual shaft 36. This shaft is provided with a handle 37 at the outer end and an angular latch bar 38 at the inner end. Latch bar 38 has a short flange 39 which is urged by means of the usual coil spring into engagement with the teeth 40 on stationary track 5. In order to provide simultaneous locking on both ends of the seat the shaft 36 is provided with a crank arm 41 to which a flexible cable member 42 is attached. This cable runs upwardly over a pulley 43 and thence across the seat to the opposite end where it is connected to a sliding latch member 44. This latch is guided in an opening 45 in track 6. The latch member 44 is urged by means of a spring 46 into engagement with teeth 47 on the fixed track 5 on the left-hand (Fig. 1) end of the seat. Latch 44 is provided with a cut out portion 48 which will be in alignment with the teeth 47 when the seat adjuster lock is disengaged. This rotation of shaft 36 by handle 37 to retract latch 39 acts through cable 42 to retract latch 44 from teeth 47.

In Fig. 5 is shown the preferred form for mounting the resilient take-up member for the ball races 15 and 16. The resilient take-up member as herein shown comprises a rubber block 50 which is held in compression between inner races 15 and passes through an opening 51 provided therefor in upper track 6. The rest of the track structure is identical with that described above.

Another modified arrangement for preloading the ball bearings and races is shown in Fig. 7. In this form the resilient member for preloading the races takes the form of a rubber block 52 for each set of inner and outer races. Each rubber block 52 is preloaded and positioned between inner race 15 and track 6. Fig. 7 also illustrates how this seat adjuster nicely lends itself to mounting the seat low to provide a maximum head clearance for the passenger. As shown, the floor pan 60 of the vehicle body is provided with a pair of parallel longitudinal depressions or wells 61 in which the lower track member 5 is mounted.

In Fig. 11 the ball bearings 22 are indicated in two positions: in the right hand position of front and rear ball bearings the seat is in its rearmost adjustment and in the left hand showing of front and rear ball bearings the ball bearings are in the position of forwardmost adjustment of the seat.

I claim:

1. In a seat adjuster, two parallel pairs of track members adapted to adjustably support a seat, each pair comprising inner and outer relatively movable track members, the inner and outer track members having vertical side walls, opposed ways extending longitudinally of the side walls of the inner track member, cooperating ways extending longitudinally of the side walls of said outer track member opposite the ways in the inner track member, the width of the inside track member being less than the inside width of the outside track member, antifriction members positioned on opposite vertical sides of the inner track member in said cooperating ways, and interlocking said inner and outer track members together, said antifriction members on both sides of said inner track member together serving as the sole support for the inner track member in the outer track member and each carrying a portion of the load imposed upon said track members, and independent resilient means acting upon said ways to load said antifriction members.

2. In a seat adjuster, inner and outer relatively movable track members, the outer track member having side walls, opposed ways extending longitudinally of the inner track member, cooperating ways extending longitudinally of the side walls of said outer track member opposite the ways in the inner track member, antifriction members positioned on opposite sides of the inner track member in said cooperating ways, said antifriction members serving as the sole support for the inner track member in the outer track member, and a rubber block under compression positioned between the ways in the inner track member for placing a load upon the antifriction members in said ways.

3. In a seat adjuster, inner and outer relatively movable track members, the outer and inner track members having vertical side walls, opposed race members extending longitudinally of the vertical side walls of the inner track member, cooperating race members extending longitudinally of the vertical side walls of said outer track member with their races opposite the races of the inner track member, antifriction members positioned on opposite sides of the inner track member in said cooperating races, said antifriction members serving as the sole support for the inner track member in the outer track member and each of said antifriction members carrying a part of the load imposed on said inner track members, the said race members being identical and each being a symmetrical metal member which may be used interchangeably one for the other.

4. The combination as set forth in claim 3 including a block of rubber under compression and positioned between the races carried by the inner track member whereby said rubber block places the antifriction members in said races under a load to prevent rattles and take up wear.

5. In a seat adjuster, a pair of spaced parallel outer track members, a pair of spaced parallel inner track members arranged for relative movement within the outer track members, the outer track members having side walls, longitudinal races on opposite sides of the inner track members, cooperating longitudinal races on the side walls of the outer track members for the races on the inner track members, said races being independent members distinct from said track members, a pair of ball bearings positioned in said cooperating races adjacent the forward end of each set of inner and outer track members, and a pair of ball bearings in the cooperating races adjacent the rear end of each set of inner and outer track members, said ball bearings interlocking the races against vertical and lateral displacement, and resilient means for urging the opposed races toward each other to load said bearings.

6. The combination as set forth in claim 5 wherein the said races are identical symmetrical metal members and said resilient means comprises rubber under compression between the inner races for urging the inner races outwardly toward the outer races to load said bearings.

7. In a seat adjuster, inner and outer relatively movable track members, said inner and said outer track members having vertical side walls, opposed ways extending longitudinally of the vertical side walls of the inner track member, cooperating ways extending longitudinally of the vertical side walls of said outer track member opposite the ways in the inner track member, antifriction members positioned on opposite sides of the inner track member in said cooperating ways, said antifriction members together serving as the sole support for the inner track member in the outer track member, said antifriction members each carrying a part of the load imposed on the inner track member, and independent resilient means acting upon said ways to load said antifriction members.

EMORY GLENN SIMPSON.

REFERENCES CITED

The following references are of record in the file of this patent:

UNITED STATES PATENTS

| Number | Name | Date |
| --- | --- | --- |
| 2,195,349 | Woina | Mar. 26, 1940 |
| 2,307,305 | Saunders et al. | Jan. 5, 1943 |
| 2,285,616 | Saunders et al. | June 9, 1942 |
| 2,261,504 | Saunders | Nov. 4, 1941 |
| 2,057,709 | Cheston | Oct. 20, 1936 |
| 2,263,834 | Andersen | Nov. 25, 1941 |
| 1,005,055 | Miller | Oct. 3, 1911 |
| 1,928,814 | Flinterman | Oct. 3, 1933 |
| 1,921,224 | Floraday | Aug. 8, 1933 |
| 1,259,261 | Mears | Mar. 12, 1918 |
| 1,106,992 | Thomas | Aug. 11, 1914 |

FOREIGN PATENTS

| Number | Country | Date |
| --- | --- | --- |
| 497,992 | British | Jan. 2, 1939 |